United States Patent
R. et al.

(10) Patent No.: US 10,187,274 B1
(45) Date of Patent: Jan. 22, 2019

(54) FLOW SAMPLING WITH DYNAMIC SAMPLING THRESHOLD ADJUSTMENT

(71) Applicant: Juniper Networks, Inc., Sunnyvale, CA (US)

(72) Inventors: Ashok Singh R., Bangalore (IN); Anish Mehta, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 103 days.

(21) Appl. No.: 15/392,355

(22) Filed: Dec. 28, 2016

(51) Int. Cl.
*H04L 12/26* (2006.01)

(52) U.S. Cl.
CPC .......... *H04L 43/024* (2013.01); *H04L 43/062* (2013.01)

(58) Field of Classification Search
CPC ............................ H04L 43/024; H04L 43/062
See application file for complete search history.

(56) References Cited

U.S. PATENT DOCUMENTS

| | | | |
|---|---|---|---|
| 7,184,437 B1 | 2/2007 | Cole et al. | |
| 2005/0195840 A1* | 9/2005 | Krapp | H04L 43/0894 370/401 |
| 2010/0161791 A1* | 6/2010 | Duffield | G06F 15/173 709/224 |
| 2011/0206049 A1* | 8/2011 | Kohn | H04L 45/7453 370/392 |
| 2017/0099224 A1* | 4/2017 | O'Connor | H04L 47/125 |

FOREIGN PATENT DOCUMENTS

WO 2013184846 A1 12/2013

OTHER PUBLICATIONS

Duffield et al., "Predicting Resource Usage and Estimation Accuracy in an IP Flow Measurement Collection Infrastructure," AT&T Labs, IMC'03, Oct. 27-29, 2003, 13 pp.

* cited by examiner

*Primary Examiner* — Benjamin H Elliott, IV
(74) *Attorney, Agent, or Firm* — Shumaker & Sieffert, P.A.

(57) ABSTRACT

The techniques described herein may dynamically adjust the sampling threshold based on a comparison of a flow export rate to a configured flow export rate. Based on the comparison of the flow export rate and the configured flow export rate, the network device may dynamically adjust the sampling threshold, such as increasing, reducing, or not changing the sampling threshold. Moreover, traffic flows are exported based on the adjusted sampling threshold. For example, if a number of bytes of a packet flow is more than or equal to the adjusted sampling threshold, network devices may export the sampled packet flow with the byte count and packet count of the sampled packet flow reported as-is. When a number of bytes of a packet flow is less than the adjusted sampling threshold, the packet flow will be exported with the byte count and packet count adjusted according to a probability.

20 Claims, 6 Drawing Sheets

FLOW SAMPLING WITH DYNAMIC SAMPLING THRESHOLD ADJUSTMENT

TECHNICAL FIELD

The disclosure relates to computer networks and, more particularly, to sampling traffic within a computer network.

BACKGROUND

A computer network is a collection of interconnected computing devices that exchange data and share resources. In a packet-based network, the computing devices communicate data by dividing the data into small blocks called packets. Devices within the network, such as routers and switches, forward the packets through the network from a source device to a destination device. The destination device extracts the data from the packets and assembles the data into its original form.

Various protocols exist that allow the network devices, such as the routers and switches, to collect and report traffic statistics. For example, the network devices deploy sampling mechanisms that collect traffic statistics on interfaces of the device where traffic is received and/or transmitted. In general, network devices may use uniform or non-uniform sampling, otherwise known as "smart sampling," to collect the traffic statistics.

In accordance with the protocols, the network device may periodically export records containing traffic statistics to a centralized device referred to as a packet flow collector. In many network environments, the collector may receive traffic flow information via traffic flow packets sent from various network locations. Consequently, a user or network administrator can use the packet flow collector to analyze overall network traffic flow. In general, the sampling mechanisms provided by network devices allow only a static, pre-defined sampling threshold to be configured.

SUMMARY

In general, techniques are described for providing traffic sampling with dynamic sampling threshold adjustment within network devices. For example, a network device may collect network traffic flows and export the traffic flows to a collector to measure the statistics of these flows to support traffic engineering, network planning, usage-based pricing, and network security. The network device may select traffic flows based on uniform or non-uniform sampling technique (e.g., smart sampling) that utilizes a sampling threshold as a reference value to determine whether or not to export the traffic flows. In particular, a traffic flow that is more than or equal to a sampling threshold will be exported to the collector with the byte count and packet count reported as-is, whereas a traffic flow that is less than the sampling threshold is exported probabilistically proportional to the size of the traffic flow, with the byte count and packet count adjusted according to the probability. That is, rather than using a static sampling threshold, techniques of this disclosure enable network devices to dynamically adjust the sampling threshold and normalize information for collected traffic flows below the threshold, which may enable more accurate traffic flow information to be collected without needing to collect information on all of the traffic flows.

In one example, a method includes receiving, by a network device, a sampled packet flow. The method also includes determining, by the network device, a flow export rate based on a total flow export count of one or more packet flows exported from the network device. The method also includes comparing, by the network device, the flow export rate to a configured flow export rate. The method also includes determining, by the network device and based on the comparison, an adjusted sampling threshold value. The method also includes configuring, by the network device and based on the adjusted sampling threshold value, a sampling threshold for the network device. The method also includes selectively exporting, by the network device, to a collector, and based on the sampling threshold, a next sampled packet flow.

In another example, a network device comprises one or more hardware-based processors, implemented using discrete logic circuitry, configured to: receive a sampled packet flow; determine a flow export rate based on a total flow export count of one or more packet flows exported from the network device; compare the flow export rate to a configured flow export rate; determine, based on the comparison, an actual flow export rate adjusted sampling threshold value; configure a sampling threshold for the server; and selectively export, to a collector and based on the sampling threshold, a next sampled packet flow.

The details of one or more embodiments are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
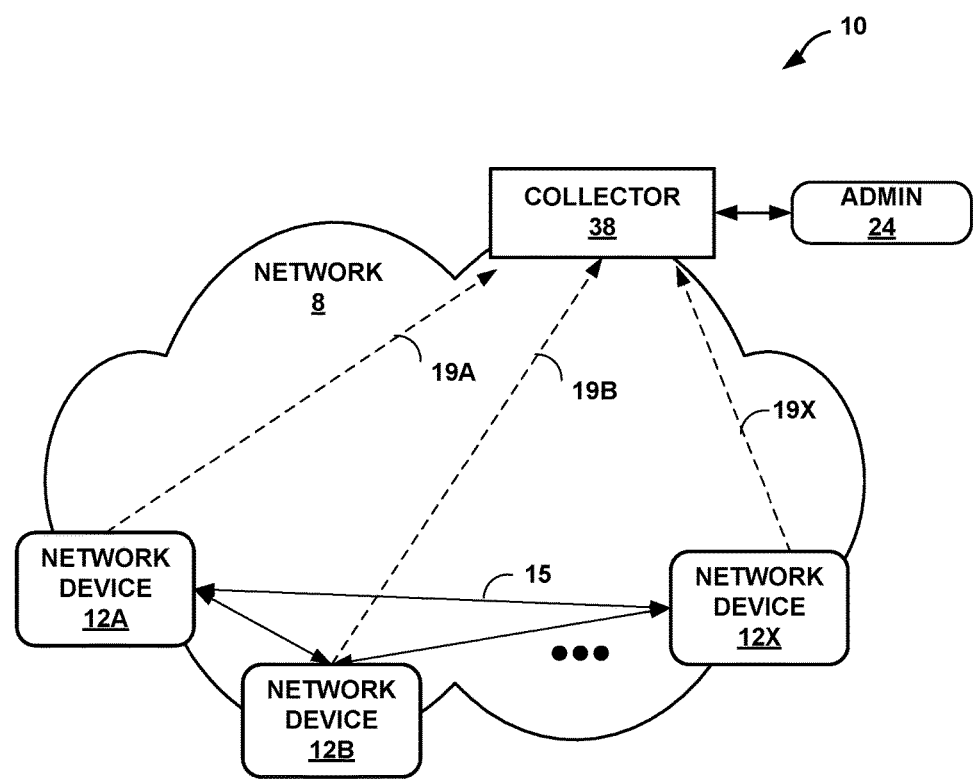
FIG. 1 is a block diagram illustrating an example system dynamically adjusting a sampling threshold and exporting a sampled packet flow based on the adjusted sampling threshold, in accordance with the techniques of this disclosure.

FIG. 1 is a block diagram illustrating an example system 10 having a number of network devices 12A-12X ("network devices 12") in which a network device 12 may dynamically adjust a packet flow sampling threshold, in accordance with the techniques of this disclosure. As illustrated in FIG. 1, each network device 12 samples packet flows, and generates packet flow records and transmits the packet flow records to collector 38. Network devices 12 may comprise dedicated computers, specialized devices, or virtual machines providing network services, such as network routers, gateways, switches, firewalls, hubs, servers, VPN appliances or other network devices that forward or otherwise provide services to packet flows.

Network 8 may represent any type of packet-switched network, such as a service provider network, a customer network, an access network, a local area network (LAN), a wide area network (WAN) or combinations thereof. Moreover, network 8 may be formed by an interconnected group of autonomous systems, each representing an independent administrative domain having a variety of networked resources capable of packet-based communication. Alternatively, network 8 may correspond to a single autonomous system that may or may not be connected to other autonomous systems. In any case, network 8 may include a variety of network devices 12 coupled to one another via communication links.

Each packet flow within network 8, such as packet flow 15, may be identified by, for example, a unique set of characteristics. In one example, a "packet flow" (also known as "traffic flow" or "flow") can be defined by the six values used in a header of a packet, or "six-tuple," i.e., a source IP address, destination IP address, source port, destination port, protocol, and direction that are used to route packets through the physical network and a communication protocol. A set of one or more packet data units (PDUs) that match a particular flow entry represent a packet flow. Packet flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TP) connection, all PDUs sourced by a particular MAC address or IP address, all PDUs having the same VLAN tag, or all PDUs received at the same switch port. The term "packet" is used herein to generally describe a unit of data communicated between network devices in conformance with a packet-based communication protocol. The techniques of this disclosure are readily applicable to systems implementing any of a variety of protocols, such as the Transmission Control Protocol (TCP), the User Datagram Protocol (UDP), the Internet Protocol (IP), Asynchronous Transfer Mode, Frame Relay, and the like. Accordingly, "packet" is used to encompass any such unit of data, and may be interchanged with the term "cell," or other similar terms used in such protocols to describe a unit of data communicated between resources within the network.

Network devices 12 may include one or more traffic flow modules (not shown in FIG. 1) that accumulate flow statistics for traffic within network 8. In some examples, the traffic flow modules may accumulate flow statistics for traffic across networks. More specifically, network devices 12 receive or otherwise capture packets (e.g., sample packets) from one or more links within network 8, and compute flow statistics indicative of packet flows (e.g., packet flow 15) over the links. As network devices 12 receive sampled packets, the traffic flow modules within the network devices update counters and compute statistics for the sampled packets flows based on the specific packets received for respective packet flows. For example, the traffic flow modules within network devices 12 may maintain, for each sampled packet flow, a packet count, byte count, source IP address, destination IP address, next hop IP address, input interface information, output interface information, total octets sent, flow start time, flow end time, source and destination port numbers, TCP flags, IP type of service, originating AS, source address prefix mask bits, destination address prefix mask bits, or the like, for each sampled packet flow. Network devices 12 may sample packet flows 15 and output flow records 19A-19X ("flow records 19") to collector 38 to communicate the flow statistics compiled by each of network devices 12.

The phrase "traffic flow record" is used herein to describe a packet or set of packets having payloads that specifically includes traffic flow information. The traffic flow modules within each of network devices 12 may provide internal accounting capabilities for maintaining flow statistics for all of the packets received by network devices 12. Additionally, other routing information within packets may readily be used to define the packet flows for which flow statistics are maintained, such as MPLS labels, VPN labels, Class of Service (CoS) information, and the like. In this manner, statistics for particularized sampled packet flows can be maintained to a level of granularity desired for effective traffic analysis.

As noted above, network devices 12 periodically communicate traffic flow records 19 to collector 38. Each of the traffic flow records 19 include traffic flow information accumulated by the respective network device, such as a number of packets, a number of bytes, a time of capturing a first packet for the flow, a time of capturing a most recent packet for the flow, an incoming interface, an outgoing interface, a source/destination network mask, a source/destination Autonomous System (AS) number, or the like.

Collector 38 receives traffic flow records 19 sent by network devices 12 and updates an accounting system or other database based on the received traffic flow records. That is, collector 38 receives traffic flow records 19 from network devices 12 and stores the traffic flow information carried by the traffic flow records within a database or other suitable data structure. In addition, collector 38 or other analysis tools may analyze the received traffic flow records 19 to aid system administrator 24 ("Admin" 24) to support network management such as traffic engineering purposes, network planning, usage-based pricing, and network security.

In general, network devices 12 may typically configure uniform sampling and non-uniform sampling techniques to collect traffic flows. Sampling with a uniform distribution may omit large traffic flows, which leads to inaccurate usage estimation. Alternatively, sampling with non-uniform distribution (otherwise known as "smart sampling") may export large traffic flows based on a sampling threshold for which larger packet flows are always exported and smaller packet flows are exported based on a probability proportional to the size of the packet flow. For example, a traffic flow that is more than the sampling threshold may always be selected for exportation with the flow record reported as-is. A traffic flow that is less than the sampling threshold may be exported based on a probability proportional to the flow size. However, smart sampling uses a static sampling threshold, which does not resolve the inconsistencies (e.g., different time periods) across network devices and results in exporting sampled packet flows that largely deviate from a configured flow export rate, which is the desired rate at which a flow is exported.

In accordance with the techniques of this disclosure, network devices 12 may dynamically adjust a sampling threshold and export a sampled packet flow to collector 38 based on the dynamically adjusted sampling threshold. In general, each of network devices 12 samples inbound (or outbound) traffic for their interfaces at a current sampling rate for the interface. In accordance with the techniques described herein, each of network devices 12 may dynamically adjust the sampling threshold based on a comparison of a flow export rate (or "actual flow export rate") of the sampled packet flow to a configured flow export rate. For example, an administrator may configure a desired flow export rate ("configured flow export rate") for which the network device may export traffic flows. In some instances, the network device may export traffic flows at a different rate than the configured flow export rate. The flow export rate may be calculated by counting the total number of flows exported per second, for example.

Based on the comparison of the actual flow export rate to the configured flow export rate, network devices 12 may determine an adjusted sampling threshold value. The adjusted sampling threshold value may represent the relationship between the actual flow export rate and the configured flow export rate. The adjusted sampling threshold value may include Boolean logic, a numerical value, or the like. That is, the adjusted sampling threshold value may indicate whether the actual flow export rate is greater than, less than, or equal to the configured flow export rate.

Based on the adjusted sampling threshold value, network devices 12 may configure a sampling threshold (otherwise referred to as "adjusted sampling threshold") for the network device. In various instances, the sampling threshold may not change, is increased, or is decreased. By dynamically adjusting the sampling threshold, the flow export rate is brought closer to the desired configured flow export rate and thereby corrects deviations between the flow export rate and the configured flow export rate.

In some examples, the sampling threshold is changed (or unchanged) based on the following comparisons of the actual flow export rate to the configured flow export rate:

| Relationship of Actual Flow Export Rate (AR) to Configured Flow Export Rate (CR) | Configuration of Sampling Threshold |
| --- | --- |
| 126% of CR > AR > 80% of CR | Unchanged |
| 80% of CR > AR > 49% of CR | Reduced by half |
| AR > 50% of CR | Reduced to a quarter |
| AR > 3 * CR | Quadrupled |
| 3 * CR > AR > 2 * CR | Tripled |
| AR > 125% of CR | Doubled |

The inequalities above are merely examples for purposes of illustration and may include other inequalities comparing the actual flow export rate and the configured flow export rate.

Moreover, network devices 12 may export the sampled packet flow based on the sampling threshold configured based on the adjusted sampling threshold value. For example, if the number of bytes of the sampled packet flow is more than or equal to the sampling threshold, network devices 12 may export the packet flow with the byte count and packet count of the sampled packet flow reported as-is. That is, large packet flows are generally exported. When the number of bytes of the sampled packet flow is less than the sampling threshold (i.e., smaller packet flows), the sampled packet flow is selected based on a probability proportional to their size and the selected sampled packet flows are exported with the byte count and packet count adjusted (e.g., upwards) according to the probability. As further described below, the selected sampled packet flows may also be normalized prior to exporting the sampled packet flow such that the sampled packet flows may account for statistics of sampled packet flows that are dropped.

To select the packet flow probabilistically, network devices 12 may calculate the probability of the sampled packet flow using the following equation: Probability=(bytes during the interval)/(sampling threshold), where bytes during the interval is the number of bytes collected for a packet sampling period of the sampled packet flow. Before exporting the selected sampled packet flows, network devices 12 may further adjust the sampled packet flow based on the relationship between the packet flow and a random number, in which the random number has a value less than the sampling threshold and greater than zero. The network devices 12 may select sampled packet flows between the random number and the sampling threshold to normalize prior to exportation. For example, when the sampled packet flow is greater than the random number and less than the sampling threshold, network devices 12 may normalize the sampled packet flow before exporting the sampled packet flow to collector 38. Network devices 12 may normalize the sampled packet flow using the following formula: Normalized flow bytes=(bytes during the interval)/Probability. If the number of bytes during the interval for a particular flow is less than the random number, in various instances, network devices 12 may not export the packet flow to controller 38.

In this way, a network device may continuously collect information about the actual flow export rate of a sampled packet flow to derive an adjusted sampling threshold such that the network device may export sampled packet flows that are more targeted to the configured flow export rate. By dynamically adjusting the sampling threshold as described above, users may target configured flow export rate regardless of the incoming traffic rate and maintain a more accurate analysis of packet flows as packet flows with high statistics are no longer dropped.

Figure 2:
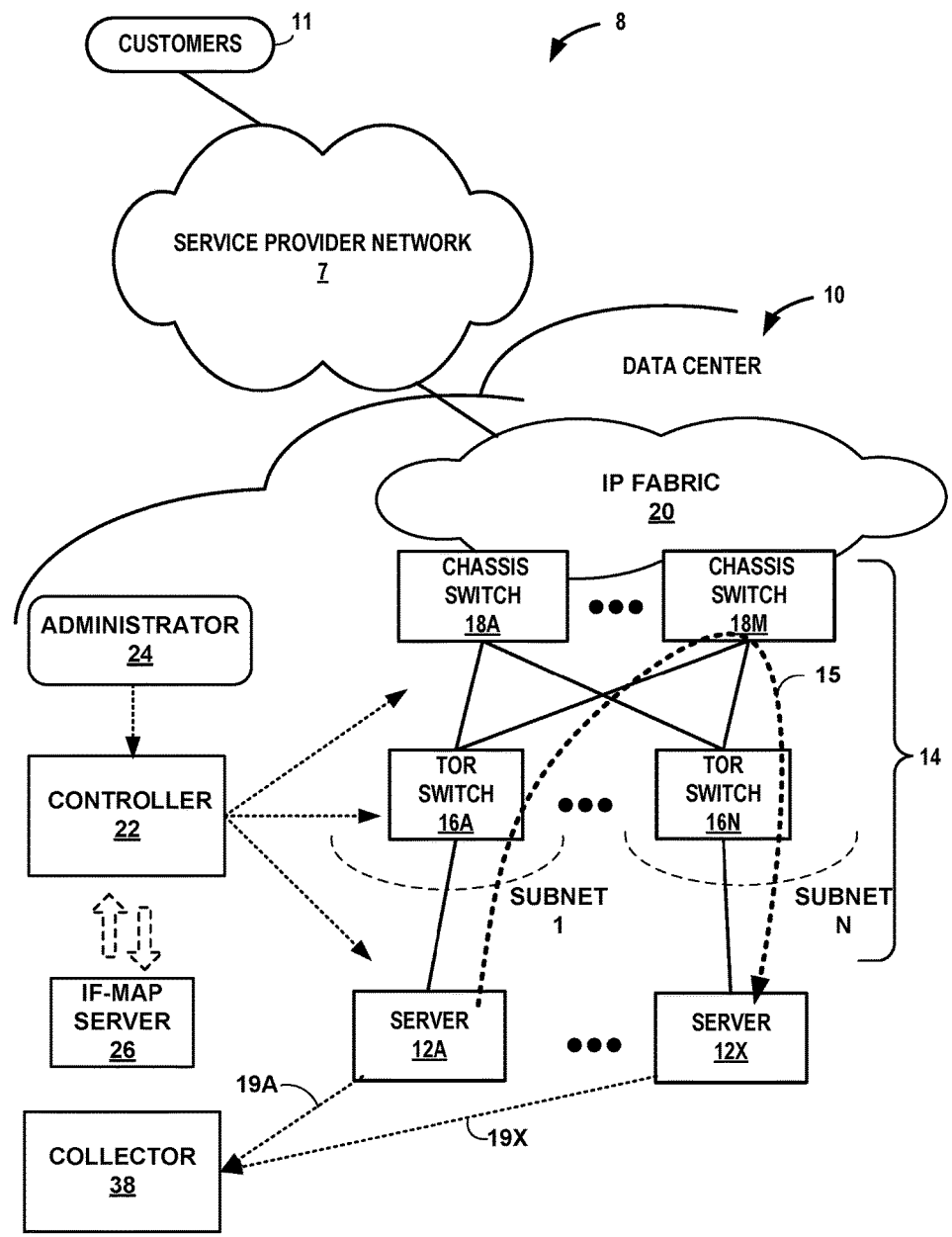
FIG. 2 is a block diagram illustrating an example network having a data center in which a server may dynamically adjust a sampling threshold and export a sampled packet flow based on the adjusted sampling threshold, in accordance with the techniques of this disclosure.

FIG. 2 is a block diagram illustrating an example network 8 having a data center 10 in which a network device may dynamically adjust a sampling threshold and export a sampled packet flow based on the adjusted sampling threshold, in accordance with the techniques of this disclosure. Data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 2, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 10 may be individual network servers, network peers, or otherwise.

In this example, data center 10 includes a set of network devices, such as storage systems and application servers 12A-12X (herein, "servers 12"), interconnected via high-speed switch fabric 14 provided by one or more tiers of physical network switches and routers. In general, switch fabric 14 represents layer two (L2) and layer three (L3)

switching and routing components that provide point-to-point connectivity between servers 12. In one example, switch fabric 14 comprises a set of interconnected top-of-rack (TOR) switches 16A-16BN (collectively, "TOR switches 16") coupled to a distribution layer of chassis switches 18A-18M (collectively, "chassis switches 18"). TOR switching 16 may be network devices that provide L2 and/or L3 routing and/or switching functionality. Classic switches 18 aggregate traffic flow and provide high-speed connectivity between TOR switches 16. Classic switches 18 are coupled to IP fabric 20, which performs L3 routing to outer network traffic between data center 10 and customers 11 by service provider network 7. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 by service provider network 7.

Controller 22 provides a high-level controller for configuring and managing routing and switching infrastructure of data center 10. Controller 22 provides a logically and in some cases physically centralized controller for facilitating operation of one or more virtual networks within data center 10 in accordance with one or more techniques of this disclosure. In some examples, controller 22 may operate in response to configuration input received from network administrator 24. Additional information regarding controller 22 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

Figure 3:
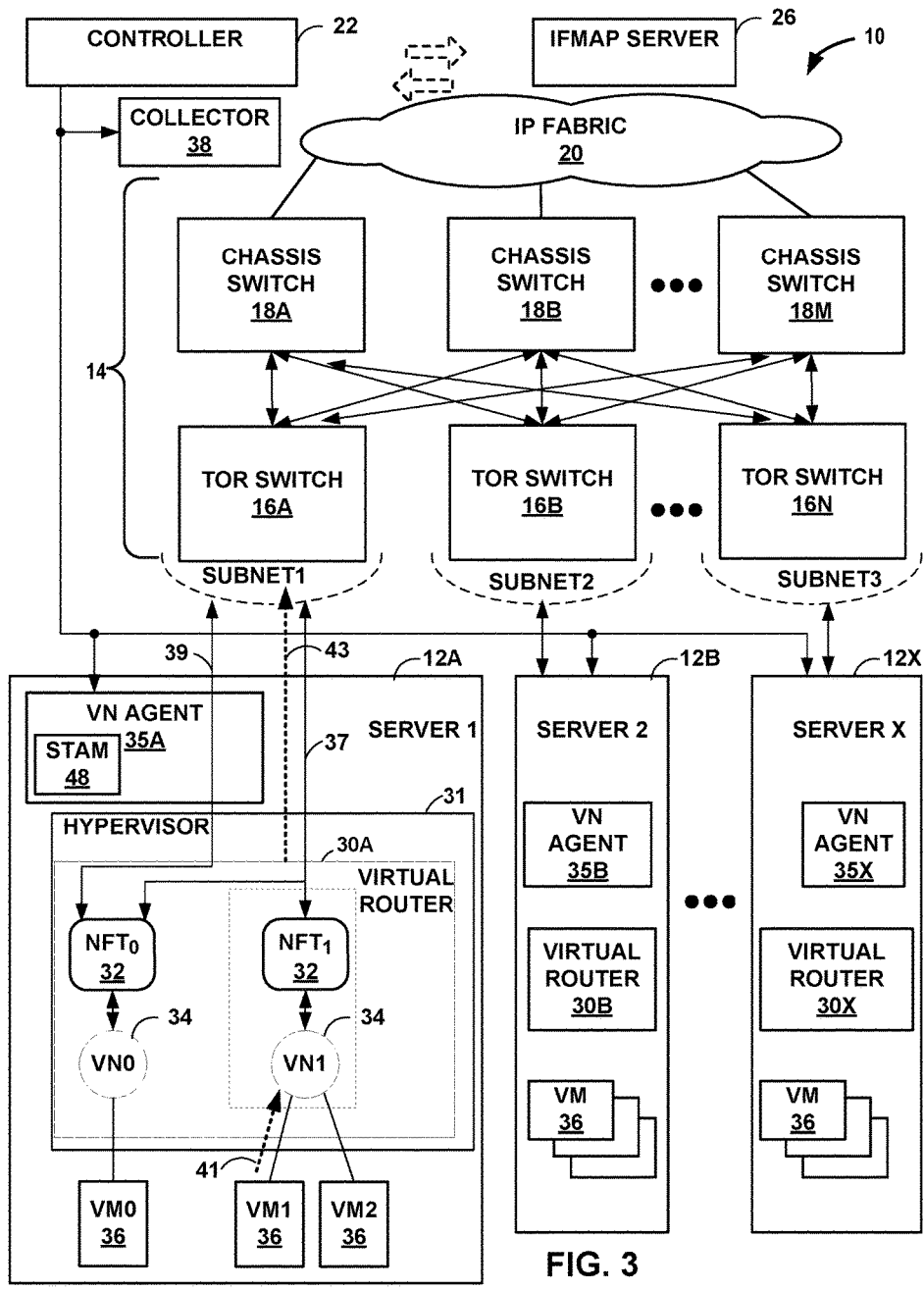
FIG. 3 is a block diagram illustrating an example implementation of data center of FIG. 2 in further detail, in accordance with the techniques of this disclosure.

In general, network traffic within switch fabric 14, such as packet flow 15 between servers 12, can traverse the physical network of the switch fabric using many different physical paths. In some examples, servers 12 may include a virtual router (as shown in the example of FIG. 3) that executes multiple routing instances for corresponding virtual networks within data center 10. Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a VxLAN tag or Multi-protocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

Servers 12 may include one or more traffic flow modules that accumulate flow statistics for traffic within network 8. More specifically, servers 12 receive or otherwise capture packets from one or more links within network 8, and compute flow statistics indicative of packet flows (e.g., packet flow 15) over the links. As servers 12 receive packets, the traffic flow modules within the servers update counters and compute statistics for the packets flows based on the specific packets received for respective packet flows. For example, the traffic flow modules within servers 12 may maintain, for each flow, a packet count, byte count, source IP address, destination IP address, next hop IP address, input interface information, output interface information, total octets sent, flow start time, flow end time, source and destination port numbers, TCP flags, IP type of service, originating autonomous system, source address prefix mask bits, destination address prefix mask bits, or the like, for each packet flow. The traffic flow modules sample packet flows 15 and output flow records 19A-19X ("flow records 19") to collector 38 to communicate the flow statistics compiled by each of network devices 12.

In accordance with the techniques of this disclosure, servers 12 may dynamically adjust a sampling threshold and export a packet flow based on the dynamically adjusted sampling threshold to a collector 38. Rather than configuring a static sampling threshold, servers 12 may dynamically update a sampling threshold based on a relation of an actual flow export rate to a configured flow export rate. Based on the relationship of the actual flow export rate to the configured flow export rate, servers 12 may configure the sampling threshold such that the sampling threshold is not changed, is increased, or is decreased.

In one example implementation, server 12A may transmit packet flows (e.g., packet flow 15) and export the flow records of the packet flows to collector 38 such that a user may measure the statistics of these packet flows. To provide a more accurate set of samples to collector 38, server 12A may, for example, periodically analyze the relationship between the actual flow export rate of the packet flow with a configured flow export rate. In one instance, server 12A may include a configured flow export rate that defines a desired export rate, and an initial sampling threshold for which to export sampled packet flows. Server 12A may sample an inner packet of sample packet flow 15 and may determine a relation of an actual flow export rate of the sampled inner packet to the configured flow export rate. Based on the comparison of the actual flow export rate and the configured flow export rate, server 12A may adjust the sampling threshold (as further described in FIG. 4).

Server 12 may export the packet flow sample (e.g., outer header and inner packet) based on the relation of the inner packet to the adjusted sampling threshold. As further described in FIG. 5, if the packet flow is more than or equal to the adjusted sampling threshold, server 12A may export the sampled packet flow with the byte count and packet count of the packet flow reported as-is. When a sampled packet flow is less than the adjusted sampling threshold (i.e., smaller packet flows), server 12 may select a sampled packet flow based on a probability proportional to their size, and are exported with the byte count and packet count adjusted (e.g., upwards) according to the probability.

For example, before exporting the selected sampled packet flows, servers 12 may adjust the packet flow based on the relationship between the packet flow and a random number. Server 12A may generate a random number less than the adjusted sampling threshold. The random number is used to determine whether the sampled packet flow is greater than or less than the random number. If the sampled packet flow is greater than the random number and less than the adjusted sampling threshold, the sampled packet flow will be exported with the byte count and packet count adjusted (e.g., upwards) according to a probability through normalization techniques (described in FIG. 1). A sampled packet flow that is less than the random number is dropped. In this way, large packet flows are selected whereas smaller packet flows are selected with a probability proportional to their size.

FIG. 3 is a block diagram illustrating an example implementation of data center 10 of FIG. 2 in further detail, in accordance with the techniques of this disclosure. In the example of FIG. 3, data center 10 includes an overlay network that extends switch fabric 14 from physical switches 16, 18 to software or "virtual" routers 30A-30X (collectively, "virtual routers 30"). Virtual routers 30 dynamically create and manage one or more virtual networks 34 usable for communication between application instances. In one example, virtual switches 30 execute the virtual network as an overlay network, which provides the capability to decouple an application's virtual address from a physical address (e.g., IP address) of the one of servers 12A-12X ("servers 12") (sometimes referred to as "compute nodes") on which the application is executing. Each virtual network may use its own addressing and security scheme and may be viewed as orthogonal from the physical network and its addressing scheme. Various techniques may be used to transport packets within and across virtual network(s) 34 over the physical network.

Each virtual router 30 may execute within a hypervisor, a host operating system or other component of each of servers 12. In the example of FIG. 3, virtual router 30A executes within hypervisor 31, also often referred to as a virtual machine manager (VMM), which provides a virtualization platform that allows multiple operating systems to concurrently run on one of host servers 12. In the example of FIG. 3, virtual switch 30A manages virtual networks 34, each of which provides a network environment for execution of one or more virtual machines (VMs) 36 on top of the virtualization platform provided by hypervisor 31. Each VM 36 is associated with one of the virtual subnets VN0-VN1 managed by the hypervisor 31.

In general, each VM 36 may be any type of software application and may be assigned a virtual address for use within a corresponding virtual network 34, where each of the virtual networks may be a different virtual subnet provided by virtual switch 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 3.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet." Encapsulation and/or de-capsulation of virtual network packets within physical network packets may be performed within virtual switches 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10 to create one or more overlay networks. Besides IPinIP, other example tunneling protocols that may be used include IP over GRE, VxLAN, MPLS over GRE, etc.

Controller 22 may include, for example, a virtual network controller that provides a logically centralized controller for facilitating operation of one or more virtual networks within data center 10. Controller 22 may, for example, maintain a routing information base, e.g., one or more routing tables that store routing information for the physical network as well as one or more overlay networks of data center 10. Similarly, switches 16, 18 and virtual switches 30 maintain routing information, such as one or more routing and/or forwarding tables. In one example implementation, virtual switch 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

For example, virtual machine 36 VM1 sends a packet 41, an "inner packet," to virtual switch 30A by an internal link. Virtual switch 30A uses $NFT_1$ to look up a virtual network destination network address for packet 41. $NFT_1$ specifies an outbound interface for virtual switch 30A and encapsulation for packet 41. Virtual switch 30A applies the encapsulation to add a tunnel header to generate outer packet 43 and outputs outer packet 43 on the outbound interface, in this case toward TOR switch 16A.

The routing information may, for example, map packet key information (e.g., destination IP information and other select information from packet headers) to one or more specific next hops within the networks provided by virtual switches 30 and switch fabric 14. In some case, the next hops may be chained next hop that specify a set of operations to be performed on each packet when forwarding the packet, such as may be used for flooding next hops and multicast replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the contents of U.S. Pat. No. 7,184,437 being incorporated herein by reference in its entirety.

As shown in FIG. 3, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, each virtual switch 30 includes a default network forwarding table $NFT_0$ and provides a default route that allows a packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14.

In accordance with the techniques of this disclosure, VN agent 35A may include a sampling threshold adjustment module 48 ("STAM 48") to analyze the "inner packet" transmitted to or received from another one of servers 12 and may determine whether to adjust a sampling threshold. Although STAM 48 is illustrated as within VN agent 35A, STAM 48 may be implemented within servers 12A or controller 22. In the example of FIG. 3, STAM 48 of VN agent 35A may compare a flow export rate ("actual flow export rate") of a sampled packet flow (e.g., packet 41) to a configured flow export rate. In response to the comparison of the actual flow export rate to the configured flow export rate, STAM 48 may configure an adjusted sampling threshold as described in FIGS. 1 and 2, and further described in FIG. 4.

VN agent 35A may also export the sampled packet flow to a collector 38 such that the statistics of the sampled packet flow may be used to support network management such as traffic engineering, network planning, usage-based pricing, and network security. The collector 38 may reside in an analytics node (not shown) that may be inside or outside of the virtual network controller 22.

STAM 48 may selectively export the sampled packed flows based on a sampled flow rate relative to a sampling threshold. In one instance, STAM 48 may determine that the packet 41 is more than or equal to the adjusted sampling threshold for which VN agent 35A may export the sampled packet flow to collector 38 with the byte count and packet count reported as-is. In another instance, STAM 48 may determine that packet 41 is less than the adjusted sampling threshold. For example, STAM 48 may calculate the probability (as described in FIG. 1) of the sampled packet flow used for selecting packet flows that are less than the sampling threshold for exportation.

To calculate the probability, STAM 48 may generate a random number that is less than the adjusted sampling threshold and greater than zero. STAM 48 may select sampled packet flows between the random number and the adjusted sampling threshold to normalize prior to exportation. That is, when the bytes during the interval for the sampled packet flow is greater than the random number and less than the sampling threshold, STAM 48 may normalize the packet flow before VN agent 35A exports the packet flow to collector 38. If the number of bytes during the interval for the sampled packet flow is less than the random number, in various instances, VN agent 35A may not export the sampled packet flow to controller 38.

Figure 4:
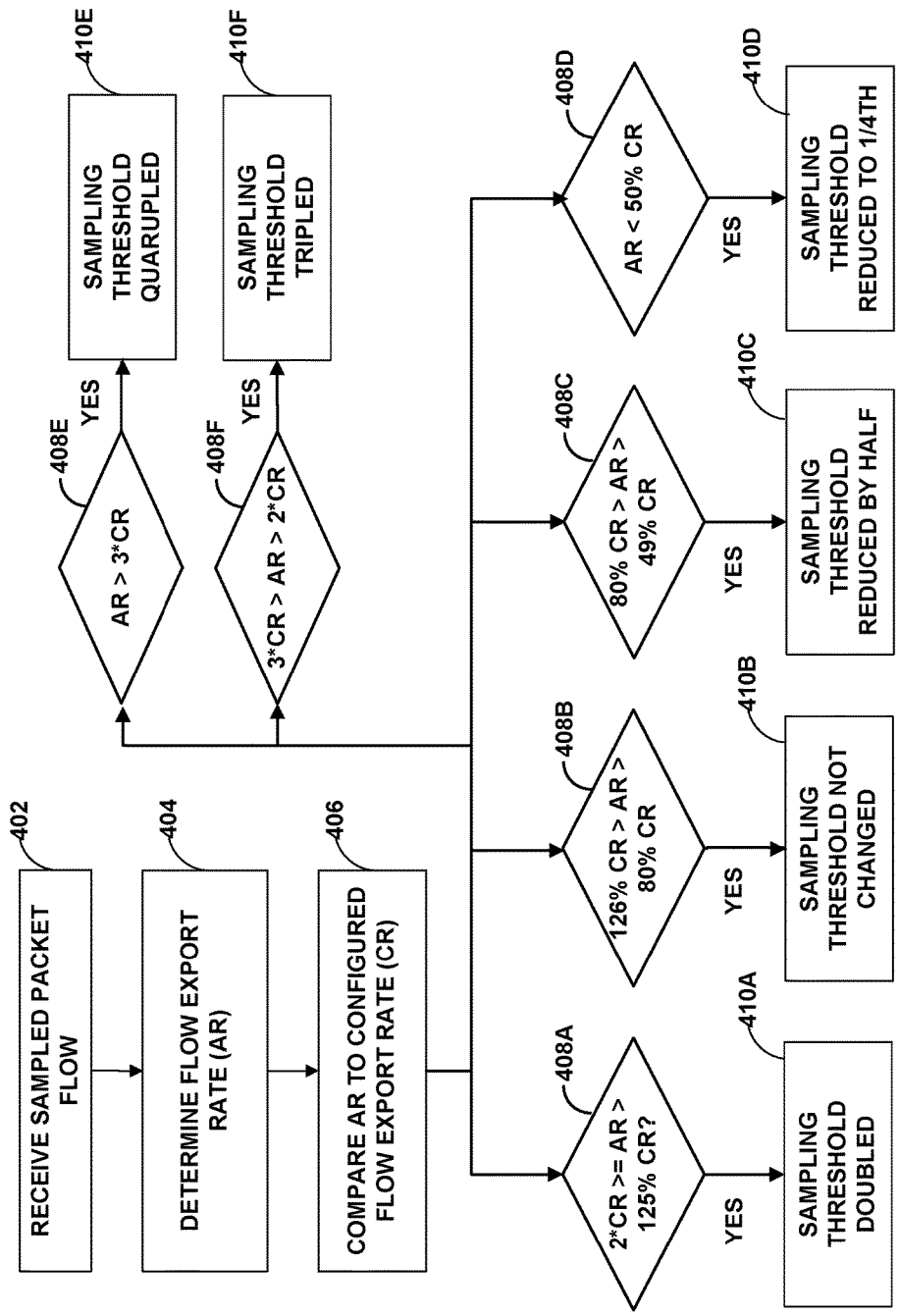
FIG. 4 is a flowchart illustrating one example operation of a network device that dynamically adjusts a network flow sampling threshold, in accordance with the techniques of this disclosure.

FIG. 4 is a flowchart illustrating one example operation of a network device configured to dynamically adjust a sampling threshold, in accordance with the techniques of this disclosure. For purposes of illustration, FIG. 4 is described in reference to network device/server 12A of FIGS. 1-3.

Network device 12A may receive one or more sampled packet flows (402). For example, network device 12A may receive a packet flow comprising an inner packet and an outer header from another one of network devices 12 in the switch fabric, and may sample the packet flow, e.g., by implementing smart sampling techniques.

Network device 12A may determine a flow export rate ("actual flow rate" or "AR") based on a total flow export count of the sampled packet flows (404). For example, the flow export count begins with value "0" and is incremented each time a flow is exported. In some examples, network device 12A may compute the flow export rate periodically (e.g., every 2 seconds) based on the number of flows exported within a duration of time.

Network device 12A may compare the flow export rate ("AR") to a configured flow export rate ("CR") (406). That is, network device 12A may calculate a relationship between the flow export rate to the configured flow export rate. In various instances, network device 12A may determine an adjusted sampling threshold value that indicates whether the flow export rate is more than, less than, or equal to the configured flow export rate. The adjusted sampling threshold value may include Boolean logic, a numerical value, or the like. As described below, network device 12A (e.g., via a sampling threshold adjustment module ("STAM") of a virtual network agent) may configure a sampling threshold for network device 12A based on this adjusted sampling threshold value.

In one instance, network device 12A may determine that the flow export rate is greater than 125% of the configured flow export rate and less than or equal to twice the configured flow export rate (408A). If the flow export rate is greater than 125% of the configured flow export rate and less than or equal to twice the configured flow export rate, network device 12A may configure a sampling threshold that is double the current sampling threshold value (410A).

In one instance, network device 12A may determine that the flow export rate is less than or equal to 126% of the configured flow export rate and more than 80% of the configured flow export rate (408B). If true, network device 12A may, based on this adjusted sampling threshold value, not change the sampling threshold (410B).

In one instance, network device 12A may determine that the flow export rate is less than 80% of the configured flow export rate and more than 49% of the configured flow export rate (408C). If true, network device 12A may configure, based on the adjusted sampling threshold value, a sampling threshold by decreasing the sampling threshold by half (410C).

In one instance, network device 12A may determine that the flow export rate is less than 50% of the configured flow export rate (408D). If true, network device 12A may configure, based on the adjusted sampling threshold value, a sampling threshold by reducing the sampling threshold to a quarter of its current value (410D).

In one instance, network device 12A may determine that the flow export rate is more than three times of the configured flow export rate (408E). If true, network device 12A may configure, based on the adjusted sampling threshold value, a sampling threshold by increasing the sampling threshold by a factor of four (410E).

In one instance, network device 12A may determine that the flow export rate is less than three times of the configured flow export rate and more than two times of the configured flow export rate (408F). If true, network device 12A may configure, based on the adjusted sampling threshold value, a sampling threshold by increasing the sampling threshold by a factor of three (410F).

The inequalities illustrated in FIG. 4 are shown for purposes of example. In some example implementations, the configured inequalities may include different ranges that determine the relation of the flow export rate to the configured flow export rate.

Figure 5:
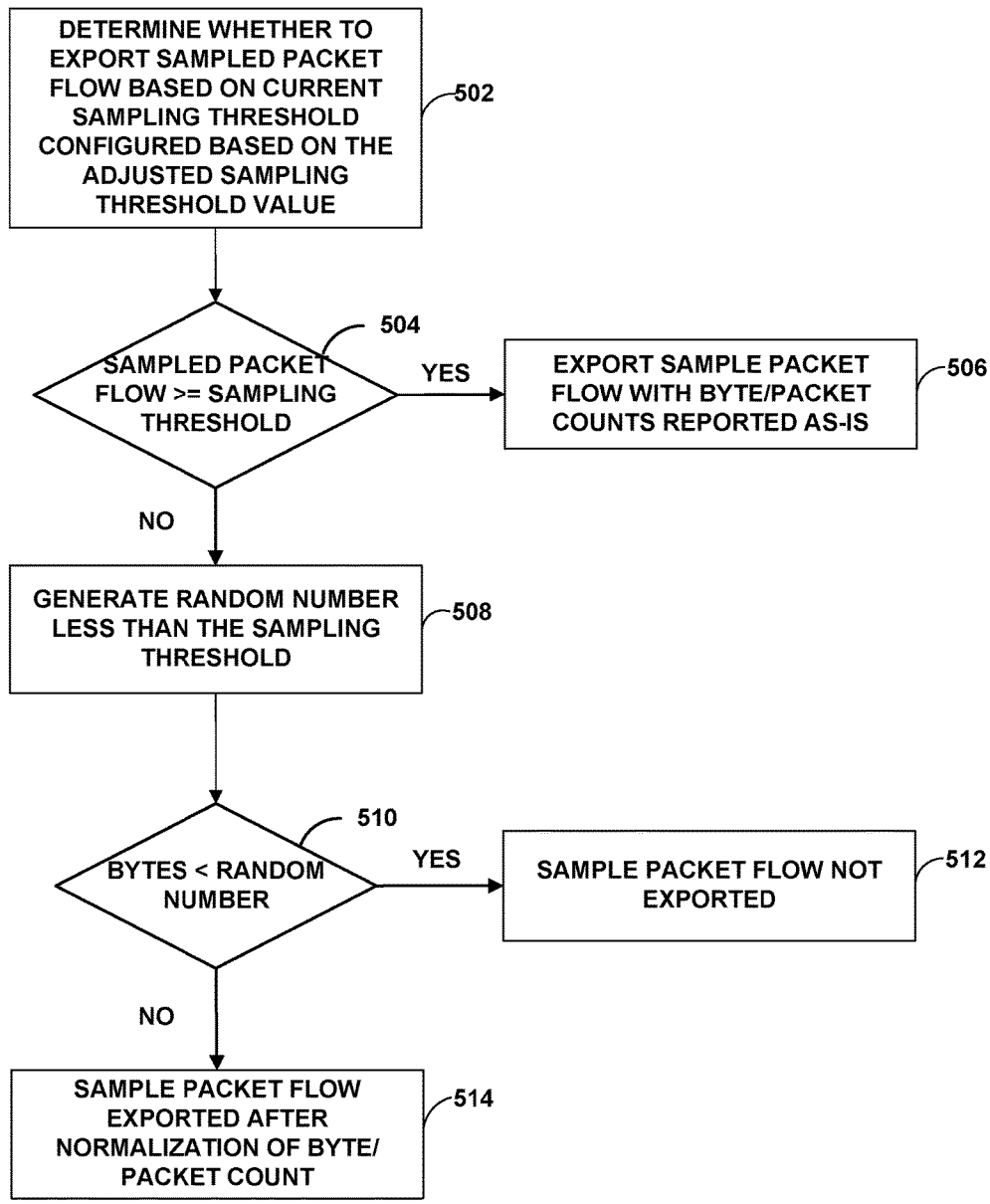
FIG. 5 is a flowchart illustrating one example operation of a network device that may export sampled packet flows based on a dynamically adjusted sampling threshold, in accordance with the techniques of this disclosure.

FIG. 5 is a flowchart illustrating one example operation of a network device configured to export packet flows based on a dynamically adjusted sampling threshold, in accordance with the techniques of this disclosure. For purposes of illustration, FIG. 5 is described in reference to network device/server 12A of FIGS. 1-3.

Network device 12A may determine whether to export a sampled packet flow based on the sampling threshold configured based on the adjusted sampling threshold value described in FIG. 4 (502). For example, network device 12A may compare the sampled packet flow to the sampling threshold configured based on the adjusted sampling threshold value (504). If the sampled packet flow is more than or equal to the sampling threshold, network device 12A may export the sampled packet flow to collector 38 with byte count and packet count of the packet flow sample reported as-is (506).

If the sampled packet flow is less than the sampling threshold, network device 12A may export the flow sample to collector 38 with the byte count and packet count probabilistically adjusted. In one instance, network device 12A may generate a random number less than the sampling threshold configured based on the adjusted sampling threshold value and greater than zero; the random number is used to determine if the sampled packet flow is normalized before exporting to collector 38 (508). To determine whether the sampled packet flow is normalized before exportation, network device 12A may compare the bytes during the interval of the sampled packet flow to the random number (510). For example, if the bytes during the interval of the sampled packet flow is less than the random number, the sampled packet flow is not exported (512). If the bytes during the interval of the sampled packet flow is more than or equal to the random number, the sampled packet flow is exported after normalization of the byte count and packet count (514).

Figure 6:
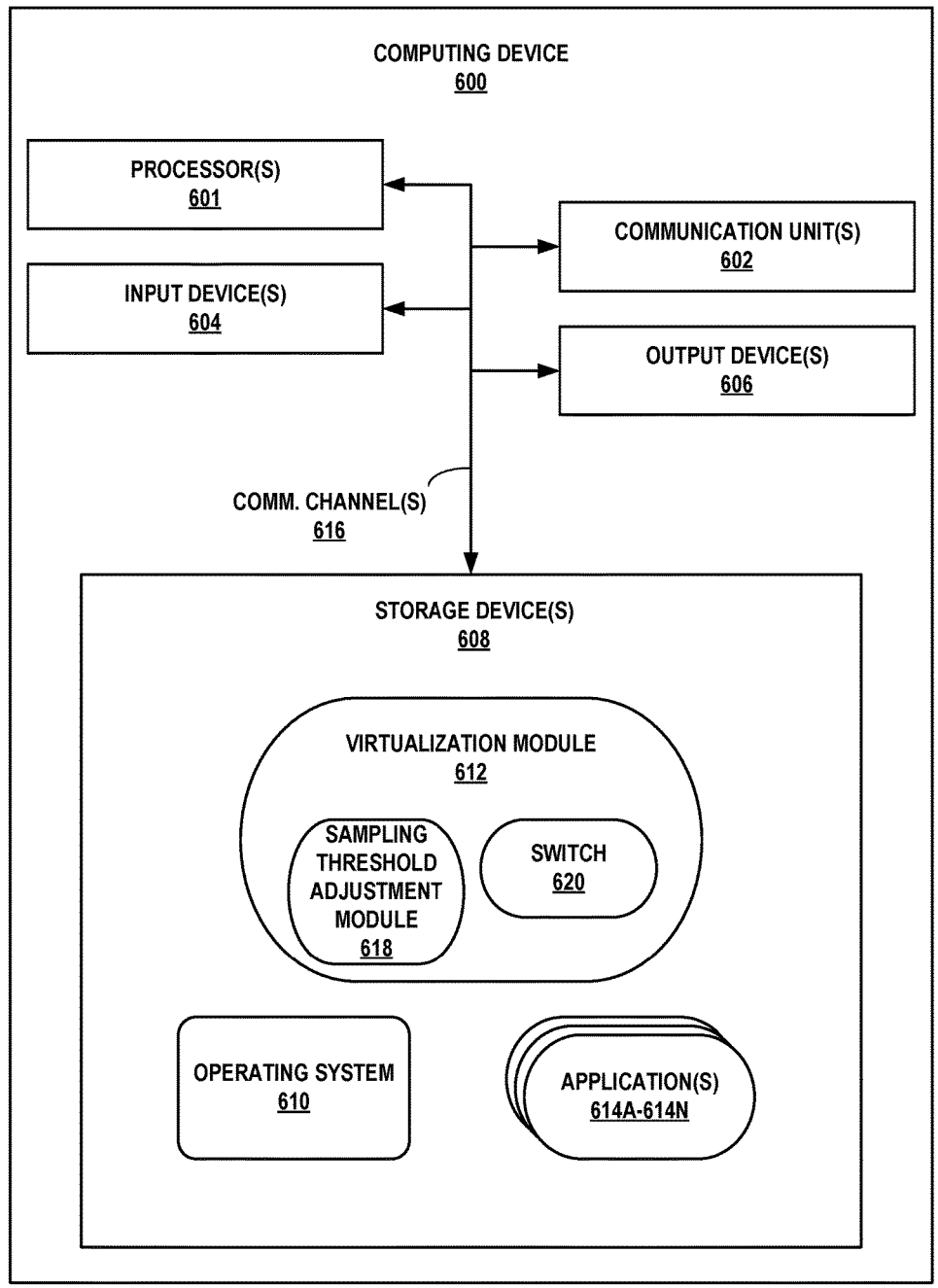
FIG. 6 is a block diagram illustrating an example computing device that may dynamically adjust a sampling threshold and export a sampled packet flow based on the adjusted sampling threshold, in accordance with the techniques of this disclosure.

FIG. 6 is a block diagram illustrating an example computing device for dynamically adjusting a sampling threshold, in accordance with the techniques of this disclosure. Computing device 600 may represent, e.g., any of network devices/servers 12, TORs 16, or chassis switches 18 of FIGS. 1-3. FIG. 6 illustrates only one particular example of computing device 600, and many other examples of computing device 600 may be used in other instances. For example, a computing device that implements TORs 16 and chassis switches 18 may include a high-speed distributed forwarding plane.

As shown in the example of FIG. 6, computing device 600 includes one or more processors 601, one or more communication units 602, one or more input devices 604, one or more output devices 606, and one or more storage devices 608. Computing device 600 further includes operating system 610, virtualization module 612, and one or more applications 614A-614N (collectively "applications 614"). Virtualization module 612 may represent hypervisor 31 of server 12A, for instance, and applications 614 may represent different VMs 36. Each of components 601, 602, 604, 606, and 608 may be interconnected (physically, communicatively, and/or operatively) for inter-component communications. As one example in FIG. 6, components 601, 602, 604, 606, and 608 may be coupled by one or more communication channels 616. In some examples, communication channels 616 may include a system bus, network connection, interprocess communication data structure, or any other channel for communicating data. Virtualization module 612 and applications 614, as well as operating system 610 may also communicate information with one another as well as with other components in computing device 600. Virtualization module 612 includes software switch 620 to switch packets on one or more virtual networks. Virtualization module 612 also includes sampling threshold adjustment module 618 to dynamically adjust a sampling threshold based on a relation of an actual flow export rate and a configured flow export rate. Sampling threshold adjustment module 618 may represent an example instance of STAM 48 of FIG. 3.

Processors 601, in one example, are configured to implement functionality and/or process instructions for execution within computing device 600. For example, processors 601 may be capable of processing instructions stored in storage devices 608. Examples of processors 601 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 608 may be configured to store information within computing device 600 during operation. Storage devices 608, in some examples, are described as a computer-readable storage medium. In some examples, storage devices 608 are a temporary memory, meaning that a primary purpose of storage devices 608 is not long-term storage. Storage devices 608, in some examples, are described as a volatile memory, meaning that storage devices 608 do not maintain stored contents when the computer is turned off. Examples of volatile memories include random access memories (RAM), dynamic random access memories (DRAM), static random access memories (SRAM), and other forms of volatile memories known in the art. In some examples, storage devices 608 are used to store program instructions for execution by processors 601. Storage devices 308, in one example, are used by software or applications running on computing device 600 (e.g., operating system 610, virtualization module 612 and the like) to temporarily store information during program execution.

Storage devices 608, in some examples, also include one or more computer-readable storage media. Storage devices 608 may be configured to store larger amounts of information than volatile memory. Storage devices 608 may further be configured for long-term storage of information. In some examples, storage devices 608 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 600, in some examples, also includes one or more communication units 602. Computing device

600, in one example, utilizes communication units 602 to communicate with external devices. Communication units 602 may communicate, in some examples, by sending data packets over one or more networks, such as one or more wireless networks, via inbound and outbound links. Communication units 602 may include one or more network interface cards (IFCs), such as an Ethernet card, an optical transceiver, a radio frequency transceiver, or any other type of device that can send and receive information. Other examples of such network interfaces may include Bluetooth, 3G and Wi-Fi radio components. In some examples, computing device 600 utilizes communication units 602 to exchange tunneled packets with other computing devices in a virtualized network domain of a data center.

Computing device 600, in one example, also includes one or more input devices 604. Input devices 604, in some examples, are configured to receive input from a user through tactile, audio, or video feedback. Examples of input devices 604 include a presence-sensitive display, a mouse, a keyboard, a voice responsive system, video camera, microphone or any other type of device for detecting a command from a user. In some examples, a presence-sensitive display includes a touch-sensitive screen.

One or more output devices 606 may also be included in computing device 600. Output devices 606, in some examples, are configured to provide output to a user using tactile, audio, or video stimuli. Output devices 606, in one example, include a presence-sensitive display, a sound card, a video graphics adapter card, or any other type of device for converting a signal into an appropriate form understandable to humans or machines. Additional examples of output devices 606 include a speaker, a cathode ray tube (CRT) monitor, a liquid crystal display (LCD), or any other type of device that can generate intelligible output to a user.

Computing device 600 may include operating system 612. Operating system 612, in some examples, controls the operation of components of computing device 600. For example, operating system 612, in one example, facilitates the communication of modules applications 614 with processors 601, communication units 602, input devices 604, output devices 606, and storage devices 610. Applications 614 may each include program instructions and/or data that are executable by computing device 600 that cause computing device 600 to perform one or more of the operations and actions described in the present disclosure.

In accordance with the techniques of this disclosure, processor 601 may process instructions for which switch 620 may receive a packet from a communication unit 602 that received a tunneled packet from other computing devices in a virtualized network domain of a data center. Switch 620 may communicate the packet via communication channel 616 to STAM 618. STAM 618 may determine a flow export rate for a sampled packet flow. STAM 618 may compare the flow export rate for the packet flow to a configured flow export rate, and may determine an adjusted sampling threshold value based on the comparison. As described above, STAM 618 may implement various inequalities to determine the adjustment sampling threshold value. Based on the adjusted sampling threshold value, processor 601 may instruct STAM 618 to configure a sampling threshold based on the adjusted sampling threshold value.

STAM 618 may use the sampling threshold to determine whether to communicate the sampled packet flow for exportation to a collector via communication unit 602. As described above, STAM 618 may calculate a probability proportional to the size of the sampled packet flow used to determine whether the packet flow is exported. To calculate the probability, STAM 618 may generate a random number that is less than the sampling threshold and greater than zero. STAM 618 may select sampled packet flows between the random number and the sampling threshold to normalize prior to exportation. That is, when the bytes during the interval for the sampled packet flow is greater than the random number and less than the sampling threshold, STAM 618 may normalize the sampled packet flow and communicate the normalized packet flow to communication unit 602 via communication channel 616. If the number of bytes during the interval for the sampled packet flow is less than the random number, in various instances, STAM 618 may not communicate the sampled packet flow to communication unit 602.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
    receiving, by a network device, one or more sampled packet flows;
    determining, by the network device, a flow export rate based on a total flow export count of the one or more sampled packet flows exported from the network device;
    comparing, by the network device, the flow export rate to a configured flow export rate;
    determining, by the network device and based on the comparison, an adjusted sampling threshold value;
    configuring, by the network device and based on the adjusted sampling threshold value, a sampling threshold for the network device; and
    selectively exporting, by the network device, to a collector, and based on the sampling threshold, a next sampled packet flow.

2. The method of claim 1, wherein selectively exporting the next sampled packet flow comprises:
    in response to determining that a number of bytes of the next sampled packet flow is greater than or equal to the sampling threshold, exporting, by the network device and to the collector, the next sampled packet flow.

3. The method of claim 1, wherein selectively exporting the sampled packet flow comprises:
    in response to determining that a number of bytes of the next sampled packet flow is less than the sampling threshold, exporting, by the network device and to the collector, the next sampled packet flow in accordance with a probability proportional to the size of the next sampled packet flow, wherein the probability is configured by dividing the bytes collected during a sampling period for the next sampled packet flow by the sampling threshold.

4. The method of claim 3, further comprising:
    generating, by the network device, a random number less than the sampling threshold;
    determining, by the network device, the next sampled packet flow is more than the random number and less than the sampling threshold;
    in response to determining that the next sampled packet flow is more than the random number and less than the sampling threshold, normalizing, by the network device, the next sampled packet flow by dividing bytes collected during a sampling period of the next sampled packet flow by the probability; and
    exporting the normalized packet flow to the collector.

5. The method of claim 1,
    wherein comparing the flow export rate to the configured flow export rate comprises determining the flow export rate is more than 80% of the configured flow export rate and less than 126% of the configured flow export rate, and
    wherein configuring the sampling threshold for the network device comprises not changing the sampling threshold.

6. The method of claim 1,
    wherein comparing the flow export rate to the configured flow export rate comprises determining the flow export rate is more than 49% of the configured flow export rate and less than 80% of the configured flow export rate, and
    wherein configuring the sampling threshold for the network device comprises reducing the sampling threshold by half.

7. The method of claim 1,
    wherein comparing the flow export rate to the configured flow export rate comprises determining the flow export rate is less than 50% of the configured flow export rate, and
    wherein configuring the sampling threshold for the network device comprises reducing the sampling threshold to a quarter of the sampling threshold.

8. The method of claim 1,
    wherein comparing the flow export rate to the configured flow export rate comprises determining the flow export rate is more than three times of the configured flow export rate, and
    wherein configuring the sampling threshold for the network device comprises increasing the sampling threshold by a factor of four.

9. The method of claim 1,
    wherein comparing the flow export rate to the configured flow export rate comprises determining the flow export rate is more than two times of the configured flow export rate and less than three times of the configured flow export rate, and
    wherein configuring the sampling threshold for the network device comprises increasing the sampling threshold by a factor of three.

10. The method of claim 1,
    wherein comparing the flow export rate to the configured flow export rate comprises determining the flow export rate is more than 125% and less than twice the configured flow export rate of the configured flow export rate, and
    wherein configuring the sampling threshold for the network device comprises increasing the sampling threshold by a factor of two.

11. A network device comprising:
    one or more hardware-based processors, implemented using discrete logic circuitry, configured to:
        receive one or more sampled packet flows;
        determine a flow export rate based on a total flow export count of the one or more sampled packet flows exported from the network device;
        compare the flow export rate to a configured flow export rate;
        determine, based on the comparison, an adjusted sampling threshold value;
        configure a sampling threshold for the server based on the adjusted sampling threshold value; and
        selectively export, to a collector and based on the sampling threshold, a next sampled packet flow.

12. The network device of claim 11, wherein, to selectively export the sampled packet flow, the one or more processors are further configured to:
    in response to determining that a number of bytes of the sampled packet flow is greater than or equal to the sampling threshold, export to the collector, the next packet flow.

13. The network device of claim 11, wherein, to selectively export the next sampled packet flow, the one or more processors are further configured to:
    in response to determining that a number of bytes of the next sampled packet flow is less than the sampling threshold, export to the collector, the next sampled packet flow in accordance with a probability proportional to the size of the next sampled packet flow, wherein the probability is configured by dividing the bytes collected during a sampling period for the next sampled packet flow by the sampling threshold.

14. The network device of claim 13, wherein, to export the next sampled packet flow in accordance with a probability proportional to the size of the next sampled packet flow, the one or more processors are further configured to:
generate a random number less than the sampling threshold;
determine the next sampled packet flow is more than the random number and less than the sampling threshold;
in response to determining the next sampled packet flow is more than the random number and less than the sampling threshold, normalize the next sampled packet flow by dividing bytes collected during a sampling period of the next sampled packet flow by the probability; and
export the normalized packet flow to the collector.

15. The network device of claim 11,
wherein, to compare the flow export rate to the configured flow export rate, the one or more processors are configured to determine whether the flow export rate is more than 80% of the configured flow export rate and less than 126% of the configured flow export rate, and
wherein, to configure the sampling threshold for the server, the one or more processors are configured to not change the sampling threshold.

16. The network device of claim 11,
wherein, to compare the flow export rate to the configured flow export rate, the one or more processors are configured to determine whether the flow export rate is more than 49% of the configured flow export rate and less than 80% of the configured flow export rate, and
wherein, to configure the sampling threshold for the server, the one or more processors are configured to reduce the sampling threshold by half.

17. The network device of claim 11,
wherein, to compare the flow export rate to the configured flow export rate, the one or more processors are configured to determine whether the flow export rate is less than 50% of the configured flow export rate, and
wherein, to configure the sampling threshold for the server, the one or more processors are configured to reduce the sampling threshold to a quarter of the sampling threshold.

18. The network device of claim 11,
wherein, to compare the flow export rate to the configured flow export rate, the one or more processors are configured to determine whether the flow export rate is more than three times of the configured flow export rate, and
wherein, to configure the sampling threshold for the server, the one or more processors are configured to increase the sampling threshold by a factor of four.

19. The network device of claim 11,
wherein, to compare the flow export rate to the configured flow export rate, the one or more processors are configured to determine whether the flow export rate is more than two times of the configured flow export rate and less than three times of the configured flow export rate, and
wherein, to configure the sampling threshold for the server, the one or more processors are configured to increase the sampling threshold by a factor of three.

20. The network device of claim 11,
wherein, to compare the flow export rate to the configured flow export rate, the one or more processors are configured to determine whether the flow export rate is more than 125% of the configured flow export rate and less than or equal to twice the configured flow export rate, and
wherein, to configure the sampling threshold for the server, the one or more processors are configured to increase the server configured to adjust the sampling threshold by a factor of two.

* * * * *